United States Patent [19]
White

[11] 4,359,823
[45] Nov. 23, 1982

[54] GRAVITY ADJUSTED COMPASS

[76] Inventor: Wilfrid G. White, Eight Sterling Dr., Dover, Mass. 02030

[21] Appl. No.: 218,644

[22] Filed: Dec. 22, 1980

[51] Int. Cl.³ .............................................. G01C 17/08
[52] U.S. Cl. ....................................... 33/364; 33/352; 33/355 R
[58] Field of Search ....................... 33/364, 352, 355 R, 33/359, 354

[56] References Cited

U.S. PATENT DOCUMENTS

| | | | |
|---|---|---|---|
| 1,294,710 | 2/1919 | Roland | 33/364 X |
| 1,376,727 | 5/1921 | Pentz | 33/352 |
| 2,941,307 | 6/1960 | Frisbie | 33/364 |
| 3,949,483 | 4/1976 | White | 33/364 |
| 3,956,831 | 5/1976 | Sibley | 33/364 |

FOREIGN PATENT DOCUMENTS 843664 6/1970 Canada ................................. 33/346

Primary Examiner—William D. Martin, Jr.

[57] ABSTRACT

A spherical compass having a gravity operated support for automatically positioning its double axis gimbal system into a horizontal plane for selective mounting of the compass with its outer athwartships gimbal system axis mounted horizontally and its fore and aft compass mounting plane oriented at any angle between the horizontal and vertical. The support comprises a gimbal support unit mounted within the pair of hemispherical compass bowls for limited vertical movement from a normal lowered position in frictional damping contact with the inner surface of the lower of the hemispherical bowls to a raised position of reduced frictional contact to permit gravity adjustment of the gimbal system fore and aft axis and the fore and aft lubber lines and compass card into a horizontal plane.

4 Claims, 2 Drawing Figures

GRAVITY ADJUSTED COMPASS

BACKGROUND OF THE INVENTION

This invention relates to improved means for orienting to a horizontal plane, the gimbal system supporting the lubber lines and compass card immersed in damping fluid of a magnetic compass of the type enclosed in a spherical housing.

In my U.S. Pat. No. 3,949,483, which is incorporated by reference herein, is shown and described compasses of the spherical type with a double axis internal gimbal system which is uniquely capable of being manually adjustable to position it in a horizontal plane to correct for any angle of a compass mounting surface between horizontal and vertical. This feature has proven valuable, since it makes it possible to mount the compass on any surface from horizontal to vertical.

However, difficulties have been encountered during installation due to the uniqueness of the design and the installer's resultant inability to operate the adjusting mechanism or his ignorance of it. Because of my continuing interest in the performance of these compasses, which are currently produced in substantial quantity, I have observed many installations on many different vessels. Of these installations, a significant number have been made without adjusting the gimble support unit to permit the gimbal system to assume a level attitude. This, of course, detracts markedly from the stability of the gimbal system and its associated forward reference, the lubber line. In some observed cases of vertical mounting, the lubber line was free to rotate in either direction and through 360°, making the compass useless.

SUMMARY OF THE INVENTION

Accordingly, it is a major object of the present invention to provide a spherical compass in which the gimble support unit is self adjusting, not only to accomodate compass mounting planes from horizontal to vertical, but also changes in fore and aft vessel trim other than those of short duration, such as are caused by rapid wave action.

It is a further object of this invention to provide a spherical compass which eliminates the need for clamping the gimble support unit.

These objects are achieved in the present invention by providing, in a spherical compass having, positioned within a pair of hemispherical bowls joined together in a plane, a double axis gimbal system having an outer athwartships axis, a fore and aft axis, fore and aft lubber lines and a rotatably mounted compass cord supported therein, gravity operated gimbal support means for automatically positioning the double axis gimbal system into a horizontal plane for selective mounting of the compass with its outer athwartships gimbal axis mounted horizontally and its fore and aft compass mounting plane oriented at any angle between horizontal and vertical.

The novel support means of the present invention comprises a gimbal support unit mounted within the bowls for limited vertical movement from a normal lowered position in frictional damping contact with the inner surface of the lower of the hemispherical bowls to a raised position of reduced frictional contact for gravity adjustment of the gimbal system fore and aft axis and the fore and aft lubber lines into a horizontal plane. The gimbal support unit preferably has a diameter slightly less than that of the inner surface of the lower bowl, permitting contact of the gimbal support unit lower portion only with the bottom inner surface of the lower bowl when the gimbal support unit is in its normal lowered position.

Preferably, the gimbal support unit is mounted within the bowls for its limited vertical movement relatively to its athwartships axis by trunnion and slot connecting means, including a pair of opposed trunnions mounted within the bowls cooperating with vertical slots on the gimbal support unit.

BRIEF DESCRIPTION OF THE DRAWINGS

For the purpose of fully describing the above and still further objects and features of my invention, reference is now made to the following detailed description of a preferred embodiment thereof, together with the accompanying drawings, wherein.

DETAILED DESCRIPTION

Figure 1:
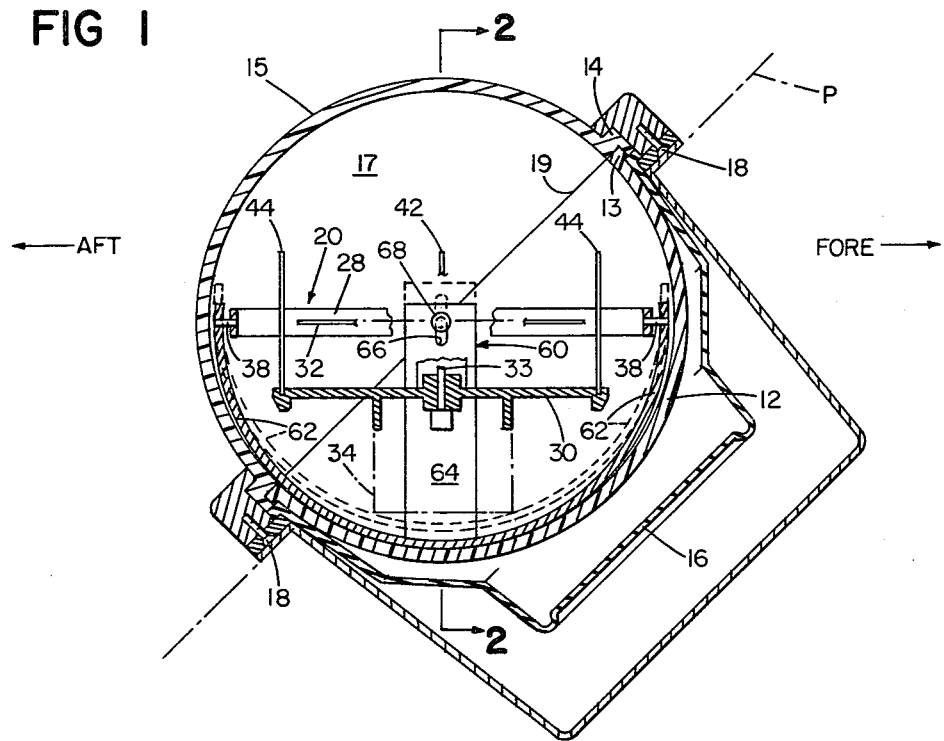
FIG. 1 is a fore and aft vertical section of a compass in accordance with the invention, shown mounted in a 45° compass mounting plane.
Figure 2:
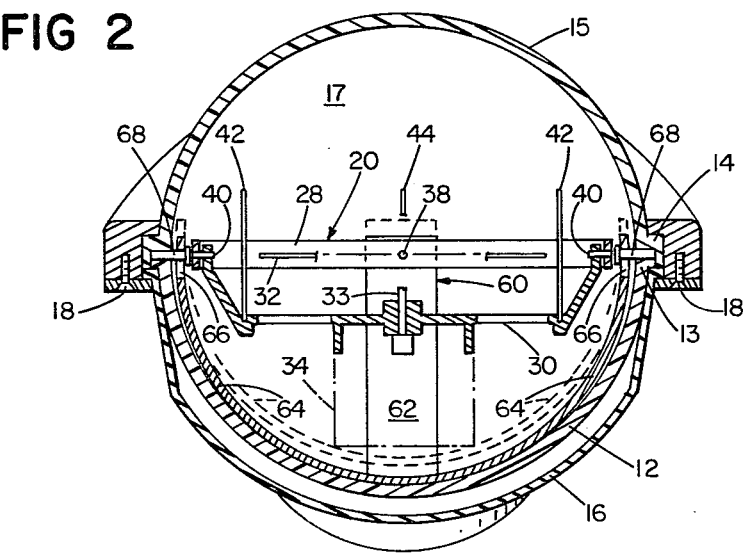
FIG. 2 is an athwartships vertical section of the compass of FIG. 1, taken along line 2—2 thereof.

The compass of the present invention is in many respects similar to those shown in my U.S. Pat. No. 3,949,483, modified to permit slight upward motion of the gimbal support unit which is sufficient to provide separation between the bottom of the support unit and the inside bottom surface of the lower hemispherical bowl. This makes possible the unique automatic adjustment by gravity of the gimbal system, both before and after installation, either by shaking or otherwise vibrating the compass, or even by motion of the vessel itself to provide an automatic fore and aft trim adjustment, into a horizontal plane, as is necessary to eliminate cardanic errors of the lubber lines and compass card assembly.

Referring to the Figures, the novel gravity adjustable, liquid filled, spherical compass of my invention has a lower hemispherical bowl 12 with its flange 13 secured in a plane parallel to the compass mounting plane 14 of transparent hemispherical cover bowl 15 by screws 18. Pliable expansion boot 16 sealed at flange 13 and 14 prevents leakage of damping liquid 17 and allows it to contract and expand without causing vacuum or pressure within the sealed unit.

A double axis gimbal system, generally designated 20, is suspended by trunnions 38 from an adjustable gimbal support unit, generally designated 60 and hereinafter more fully described. Gimbal system 20 comprises gimbal ring 28 and lubber line support 30 supporting athwartship lubber lines 42 and fore and aft lubber lines 44. Lubber line support 30 is mounted within gimbal ring 28 by inner trunnions 40. Damping web 34 hangs from lubber line support 30. The compass card 32 is supported by a shaft 33 and jewel bearing (not shown) extending upwards from the center of lubber line support 30. It lies in the plane of gimbal ring 28 adjacent to athwartship lubber lines 42 and fore and aft lubber lines 44.

Since the mounting plane P of the compass after installation will always be parallel to the equator 19 of the spherical compass, it will be appreciated that by adjusting support unit 60, it will always be possible to orient gimbal ring 28, and hence the whole double axis gimbal system 20, to a horizontal plane.

According to the present invention, support unit 60 comprises a four armed 90 degree cross shaped member formed to provide a hemispherical outer surface. Its fore and aft arms 62 are connected to gimbal ring 28 by trunnions 38 for relative rotation about a fore and aft axis. Its athwartship arms 64 are provided with short vertical slots 66 cooperating with opposed athwartship trunnions 68 which are mounted in the equatorial plane of the junction 19 of upper bowl 15 and lower bowl 12. This arrangement provided both for relative rotation about the outer athwartships axis of trunnions 68 and for limited relative vertical movement from a normal lowered position in frictional damping contact with the inner surface of lower bowl 12 to a raised position of reduced frictional contact, shown in dotted lines in the Figures.

The outside radius of support unit 60 is slightly less than the inside radius of lower bowl 12. The short slots 66 have the centers of their length located on the center of the outside radius of support unit 60 and have an overall length equal to the diameter of the shank of trunnions 68 plus at least twice the difference between the outside radius of support unit 60 and the inside radius of spherical bowl 12.

In the Figures, support unit 60 and lower bowl 12 are shown in contact at their lower extremities, with trunnions 68 adjacent the top of short slots 66, so that support unit 60 is free to move vertically upwardly to reduce contact friction between support unit 60 and lower bowl 12, as shown in the dotted line position of support unit 60.

Either before or after installation on any surface between horizontal and vertical, the compass can be shaken, vibrated or thumped so that support unit 60 moves by gravity to a position in which the axis of fore and aft trunnions 38 is in a horizontal plane.

The unique mounting of gimbal support unit 60 makes possible the automatic adjustment by gravity of the gimbal system fore and aft axis and lubber lines, either by shaking or otherwise vibrating the compass or even by motion of the vessel itself to provide an automatic fore and aft trim adjustment, to a horizontal plane, which is required to eliminate cardanic errors of the lubber lines and compass card assembly.

When at rest, gimbal support unit 60 rests against the bottom of lower compass bowl 12 and, since it has significant negative buoyancy in liquid 12, it frictionally resists movement due to any rapid fore and aft motion caused by wave action. However, it will automatically adjust to longer term displacement, such as is caused by changes in fore and aft vessel trim.

The presence of damping liquid 17 between the lower spherical surface of gimbal support unit 60 and the lower inner surface of lower compass bowl 12 provides reduced friction except when actual frictional contact exists between support unit 60 and lower bowl 12.

Tests of compasses made according to this invention bear out the gravity levelling feature of support unit 60.

Further, the costly and complex mechanism and installation instructions of the construction of my said earlier patent are avoided, while at the same time improving the performance of the spherical compass.

Various modifications of the novel gravity adjustable compass of my invention, within the spirit thereof and the scope of the appended claims, will occur to those skilled in the compass art. For example, the invention may also be utilized in a simplified compass construction in which the compass card, with or without its associated lubber lines, is rotatably mounted directly on the support unit 60.

I claim:

1. In a spherical compass having, positioned within a pair of hemispherical bowls joined together in a plane, a double axis gimbal system having an outer athwartships axis, a fore and aft axis, fore and aft lubber lines and a rotatably mounted compass card supported therein, that improvement which comprises
   gravity operated gimbal support means for automatically positioning said double axis gimbal system into a horizontal plane for selective mounting of said compass with its athwartships gimbal system axis mounted horizontally and its fore and aft compass mounting plane oriented at any angle between the horizontal and vertical
   said support means comprising
   a gimbal support unit mounted within said bowls for limited vertical movement from a normal lowered position in frictional damping contact with the inner surface of the lower of said hemispherical bowls to a raised position of reduced frictional contact for gravity adjustment of said gimbal system fore and aft axis and said fore and aft lubber lines into a horizontal plane.

2. In a spherical compass as claimed in claim 1, wherein
   said support unit is mounted within said bowls for said limited vertical movement relatively to its athwartships axis by trunnion and vertical slot connecting means.

3. In a spherical compass as claimed in claim 2, wherein
   said support unit is mounted within said bowls for said limited vertical movement relatively to its athwartships axis by trunnion and slot connecting means including a pair of opposed trunnions mounted within said bowls cooperating with vertical slots on opposite sides of said support unit.

4. In a spherical compass as claimed in claim 2 or 3, wherein
   said support unit has a diameter slightly less than that of the inner surface of the lower of said bowls permitting contact of the support unit lower portion only with the bottom inner surface of said lower bowl when said support unit is in its normal lowered position.

* * * * *